US007652573B2

(12) United States Patent
Donat et al.

(10) Patent No.: US 7,652,573 B2
(45) Date of Patent: Jan. 26, 2010

(54) OBJECT PRESENCE ANALYSIS SYSTEM AND METHOD

(75) Inventors: Stefan Donat, München (DE); Wolfgang Richter, Germering (DE); Peter Rosenbeck, Gauting (DE)

(73) Assignee: Ident Technology AG, Wessling (DE)

( * ) Notice: Subject to any disclaimer, the term of this patent is extended or adjusted under 35 U.S.C. 154(b) by 26 days.

(21) Appl. No.: 10/515,895

(22) PCT Filed: May 23, 2003

(86) PCT No.: PCT/EP03/05432

§ 371 (c)(1), (2), (4) Date: Sep. 26, 2005

(87) PCT Pub. No.: WO03/100739

PCT Pub. Date: Dec. 4, 2003

(65) Prior Publication Data

US 2006/0109135 A1 May 25, 2006

(30) Foreign Application Priority Data

| | | | |
|---|---|---|---|
| May 23, 2002 | (DE) | ................................ | 102 22 859 |
| Sep. 26, 2002 | (DE) | ................................ | 102 45 181 |
| Nov. 12, 2002 | (DE) | ................................ | 102 52 580 |

(51) Int. Cl.

| | |
|---|---|
| ***G08B 13/14*** | (2006.01) |
| ***G08B 1/08*** | (2006.01) |
| ***H04M 11/04*** | (2006.01) |

(52) U.S. Cl. .............................. 340/568.1; 340/539.32; 455/404.2

(58) Field of Classification Search ... 340/568.1–572.9, 340/539.13, 539.15, 539.11, 539.21, 539.19, 340/539.32; 455/404.1, 404.2, 3.06, 421, 455/66.1, 90.1, 344
See application file for complete search history.

(56) References Cited

U.S. PATENT DOCUMENTS

| | | | | | |
|---|---|---|---|---|---|
| 4,494,950 | A | | 1/1985 | Fischell | 604/66 |
| 4,593,273 | A | * | 6/1986 | Narcisse | 340/573.4 |
| 5,175,868 | A | * | 12/1992 | Yasuoka | 340/7.2 |
| 5,583,486 | A | | 12/1996 | Kersten | 340/572.1 |
| 5,742,233 | A | * | 4/1998 | Hoffman et al. | 340/573.1 |
| 5,796,827 | A | | 8/1998 | Coppersmith | 380/9 |
| 5,822,714 | A | * | 10/1998 | Cato | 702/108 |
| 5,874,896 | A | * | 2/1999 | Lowe et al. | 340/572.1 |
| 5,987,188 | A | | 11/1999 | Freyre | 382/278 |
| 6,100,804 | A | * | 8/2000 | Brady et al. | 340/572.7 |
| 6,100,806 | A | * | 8/2000 | Gaukel | 340/573.4 |

(Continued)

FOREIGN PATENT DOCUMENTS

| | | |
|---|---|---|
| GB | 2306725 | 5/1997 |

(Continued)

*Primary Examiner*—Jennifer Mehmood
(74) *Attorney, Agent, or Firm*—Andrew Wilford

(57) ABSTRACT

A presence analysis system for objects carried by a user has a signal-transmitter provided on the object to be observed in terms of its presence for transmitting an object or signal-transmitter specific signal and a receiver for receiving signals including the object or signal-transmitter specific signal. A capacitative link formed by the person or clothing of the person conducts the signal from the transmitter to the receiver. An analysis unit coupled with the receiver generates an output signal indicating the presence or absence of the object by analysis of the signals received.

7 Claims, 7 Drawing Sheets

U.S. PATENT DOCUMENTS

| | | | | |
|---|---|---|---|---|
| 6,204,764 | B1 | 3/2001 | Maloney | 340/568.1 |
| 6,211,799 | B1 | 4/2001 | Post | 341/33 |
| 6,624,752 | B2 * | 9/2003 | Klitsgaard et al. | 340/572.1 |
| 6,714,133 | B2 * | 3/2004 | Hum et al. | 340/573.4 |
| 6,864,780 | B2 | 3/2005 | Doi | 340/5.64 |
| 6,888,464 | B1 * | 5/2005 | Maloney | 340/573.1 |
| 6,961,001 | B1 * | 11/2005 | Chang et al. | 340/573.4 |
| 7,034,695 | B2 * | 4/2006 | Troxler | 340/573.4 |
| 2003/0151506 | A1 * | 8/2003 | Luccketti | 340/539.13 |

FOREIGN PATENT DOCUMENTS

| | | |
|---|---|---|
| JP | 63316298 | 12/1988 |

* cited by examiner

OBJECT PRESENCE ANALYSIS SYSTEM AND METHOD

CROSS REFERENCE TO RELATED APPLICATIONS

This application is the US national phase of PCT application PCT/EP03/05432, filed 23 May 2003, published 4 Dec. 2003 as WO 2003/100739, and claiming the priority of German patent application 10222859.0 itself filed 23 May 2002, German patent application 10245181.8 itself filed 26 Sep. 2002, and German patent application 10242580.3 itself filed 12 Nov. 2002, whose entire disclosures are herewith incorporated by reference.

FIELD OF THE INVENTION

The invention generally relates to object presence analysis, especially that of objects which are worn in the immediate vicinity of a user, on the body thereof for example, or is in the clothing thereof. The invention more specifically relates to a system, components of the system and to a method used to determine the presence of specific objects in a reliable manner in the immediate vicinity of a user, i.e. enabling the presence of the objects to be determined.

BACKGROUND OF THE INVENTION

For example in the field of disaster prevention, personnel must be equipped with certain devices to fulfill their responsibilities. The verification of the equipment scope is frequently difficult and can often not be reliably performed, especially when staff is pressed for time. It may also happen that equipment is lost without the staff being aware of it and that the loss goes initially undetected. The undetected loss of objects from the immediate vicinity of a person, for example the loss of valuables through inattention or theft, is a common problem in every-day life as well.

OBJECT OF THE INVENTION

In consideration of the above, the invention is based on the object of providing solutions that detect, analyze or monitor the presence of specific objects on a person, i.e. the presence of objects in an immediate vicinity, such as the area close to the body, in a reliable manner.

SUMMARY OF THE INVENTION

The invention presented here is based on an approach whereby a signal is generated by a signal transmitter, which is assigned to the object that is to be monitored and which is, more particularly, connected thereto. The signal is fed into a receiver via a user, especially the body thereof and/or clothes thereof. An indicative analysis output signal is produced with regard to the presence of an object as a result of signal-processing-based observation of the reception event detected via the user or the clothes thereof.

This provides a beneficial solution insofar that in continual analysis procedures or in successive analysis procedures implemented at predefined time intervals, the presence of respectively equipped objects in the immediate vicinity of the user is detected, whereby the lack of presence is immediately reported, preferably without the user having to take any action, via an automatically generated transmission signal. Based on the recorded presence or lack of presence, user-specific signal outputs can be beneficially generated based on selectively defined assessment criteria.

The incorporation of an invention-relative signal transmitter into a valuable item, for example a wallet, allows the recording of the loss of this wallet from the defined immediate vicinity of the user within a very short period of time, for example, within 300 milliseconds.

BRIEF DESCRIPTION OF THE INVENTION

To solve the above task, the invention presented here provides a system pursuant to claim 1. The invention-relevant system includes at least one signal transmitter, which is assigned to the object to be assessed for its presence; designed to send the object or transmitter specific signal; a receiver for the recording of the reception event, which in the event of an object presence contains the object or transmitter specific signal, and an assessment device, which is coupled with the receiver, for the generation of a analysis output signal indicative of the presence of the object based on a signal-processing analysis of the reception event.

The reception event recorded by the receiver is verified by a preferably programmable assessment device in the area of the receiver. If it detects that the reception event contains the signal generated by the signal transmitter, the assessment device is in a position to generate an analysis output signal that indicates that the observed object is still within the analysis area. However, if the assessment device determines that a presence of the signal transmitter and thus of the connected object cannot be detected in the analysis area in regard to the reception event recorded by the receiver, the assessment device is in a position to generate an analysis output signal that indicates that the observed object is not present. Such an output signal can initiate a warning process. This warning process can produce warning signals, which are perceived by the senses of the user equipped with a respective analysis system. Such warning signals can be communicated to the user via acoustic, optical and/or the sense of touch, i.e. made accessible to the user through haptiv methods. It is possible to integrate the receiver into items that are easy to lose, such as cell phones and/or PDAs. Preferably, the system thus constructed is configured in such a way that the removal of the receiver from the observation area also results in the generation of, for example, an acoustic warning signal.

According to an especially preferred design of the invention, the signal transmitter is to be designed in such a way that it couples especially these object and transmitter specific signals on the basis of capacity and/or electromagnetic counter effects with a user carrying the receiver; at least for the partial transmission of the signal transmitted by the signal transmitter, in particular object and/or transmitter specific signals via the body and/or clothing of the user. The incorporation of the user's body or clothing into the signal transmission path between the signal transmitter and the receiver creates an interlinked system of signal transmitter, user or user's clothing and receiver, whereby the quality of the existence or non-existence of a signal linkage between the system components determines the generation of this analysis output signal.

Given that the inductive and/or capacitive de-coupling of the signal transmitter from the user equipped with the receiver results in a significant reduction of intensity of the signal portion initiated by the signal transmitter in the reception event recorded by the receiver, the presence or lack of presence of the object in the monitoring area can be determined very reliably.

Optimally, the receiver includes a reception organ for the recording of the object or transmitter specific signal from the user or the latter's clothing based on capacitive counter effects.

Preferably the reception organ is situated in such a way that it records the signals coupled with the user or the user's clothing with a high level of signal recording efficiency. An especially high level of signal recording efficiency can be attained by wearing the reception organ close to the body, especially in the waistband or shirt pocket area, or especially if contact with the skin is made. The reception organ may, for example, be integrated in a piece of jewelry, a cell phone, or especially, in a wrist watch. Optimally, the reception organ is designed as a flat component, which can, for example be attached to the back of a wrist watch without being noticeable, or that can be integrated into a watch.

It is possible to design the transmitter in such a way that the signal sent contains a data string. It is possible to identify the signal transmitter via this data string. It is also possible to transfer data via this data string, which have been generated in the area of the signal transmitter in its interplay with the object to be observed. It is, for example, possible to conFIG. a signal transmitter assigned to an image recording device in such a way that it transmits data with the data string that provides information on the availability of the image recording device—or other information/analytical values recorded in the scope of the assigned object. An invention-relevant signal transmitter assigned to an air filter device, for example, can transfer data through the data string that provides information on the condition of the filter in the air filter. A signal transmitter assigned to an ammunition magazine can additionally provide information on the presence of a magazine and the fill level of this magazine via the data string.

Optimally, the data string is transmitted as a pulse signal, preferably complying with a predefined bit pattern. In addition to the content of the data string, it is also possible to identify the transmission equipment responsible for the transmission of the signal based on the time intervals between successively transmitted data strings or characteristic pulse sequences. The identification of the signal transmitter has proven especially advantageous when the invention-relevant system for the analysis of several objects also includes several signal transmitters. The identification of the signal transmitters can be implemented based on an identification code inherent in each signal transmitted and/or other, largely definite, characteristics of the signals transmitted by the respective transmitter.

In particular to realize a system monitoring several objects the signal transmitters provided on the objects are preferably configured in such a manner that the transmitted signals, in particular the object or signal transmitter specific signals are available without overlays, at least in phases. The virtually overlay-free arrival of the signals transmitted by the signal transmitters can be achieved especially through the pulsating transmission of signals, whereby the pulses preferably have relatively short phase lengths and the intervals between the pulses are, for example, at least times factory 10. It is also possible to generate the signals in pulses in such a manner that the pulse length and/or the intervals between the signal sequences vary, for example based on the principle of randomness. This makes it possible to warrant an overlay-free arrival of the signals sent out by the individual signal transmitters at the receiver within a time window that is not prohibitively long and with an adequately high level of probability.

It is also possible to equip the receiver with a trigger signal transmitter sending out trigger signals. Preferably transmitted via a coded trigger signal, it is possible to address the individual signal transmitters specifically and to request signal transmission within a predefined time matrix or for the desired information content. To allow such a possibly also encoded signal dialog between the receiver and the individual transmitter, the relevant signal transmitter is equipped with a trigger signal recording device.

The signal transmitters can be equipped with their own power source, such as for example a button cell, which provides the energy required for signal generation. Alternatively, or in is combination with this measure, it is possible to transfer the energy required to generate the signal via the signal transmitter electro-magnetically and/or via capacitive measures (field-electrical measures) to the signal transmitter, especially via the trigger signal. Such a design of a signal transmitter thus includes an absorption device created by a trigger signal recording device, for the absorption of the energy fractions coupled with the user based on capacitive counter effects, whereby at least a part of the absorbed energy fractions in the signal transmitter is utilized to generate the object or transmitter specific signal.

In addition to the system described above, the invention presented here also refers to the individual components of such a system as such, in particular in traffic or purpose specifically prepared units of the signal transmitter and/or the receiver.

The receiver can be designed as an autonomous reception module or can be integrated as another function component, for example of a mobile phone, preferably in combination with the utilization of function groups of this function unit. In the event that the invention-relevant receiver is incorporated into a mobile phone, it is possible to utilize its optical, acoustical and, if applicable, touch output functions.

The signal transmitter preferably should be designed in such a way that it can be couple optimally with the object to be observed for its presence. To achieve this, the signal transmitter can, for example, be designed as a foil component and in the way of a self-adhesive label connected with the object to be observed. An especially advantageous solution to determine the presence of a wallet in the vicinity of the user is a design using a credit-card style element that can, for example, be inserted into the card section of the wallet.

According to the invention, the afore described system utilizes a process for the implementation of a presence analysis of objects, during which an object or transmitter specific signal is transmitted by a signal transmitter connected with the object to be observed during a signal transmission phase; and during which a reception signal received by a receiver is analyzed during a signal reception analysis phase to determine whether the object equipped with the transmitter is located in an observation area. The observation area can optimally be defined as the area, in which the signal generated by the signal transmitter can still be received by the receiver with the predefined minimum signal intensity. Especially during a transmission of the signal from the signal transmitter via electromagnetic and/or capacitive modes, a clearly identifiable intensity reduction occurs if the object to be observed is removed from the vicinity of the body of the user.

Preferably, the signal transmitter is being trigger-operated in terms of the transmission of the object and/or transmitter specific signal. It is possible to address the signal transmitter specifically and to initiate a signal feedback through the addressing function. An analysis signal indicating a lack of presence of the observed object can be produced if the required feedback from the signal transmitter does not occur. This signal feedback may not occur because the trigger signal or the signal addressing the signal transmitter have no longer been able to reach the signal transmitter. The feedback can also be prevented if the trigger or request signal has indeed reached the signal transmitter, but the transmitted feedback signal does not arrive at the signal receiver or arrives at the signal receiver with an intensity that is too low due to too great a distance from the user.

In particular in cases where several signal transmitters are utilized the object and/or transmitter specific signals generated are preferably transmitted on different frequency bands. This allows the parallel transmission and individual collision-free identification of signals from different signal transmitters. It is possible to conFIG. the signal transmitters in such a way that the object or transmitter specific signals generated by the latter are sent out in pulses on two different frequency bands. The timely intervals between the pulse sequences occurring on the two different frequency bands, the pulse sequences as such and/or in particular the content of the pulse sequences, can be utilized to identify the respective signal transmitters as well as to transmit additional information. It is possible to also conFIG. the signal transmitters insofar that the signals transmitted by the latter are related to the receiver collision-free with a high statistical probability.

The observation and analysis area is the area in which a signal transmission between the signal transmitter and the receiver occurs with for example a signal characteristic identifiable by an intensity threshold. The analysis device can be configured to accommodate the desired observation characteristics. This makes it possible to, for example, predefine the monitoring scope. It is also possible to conFIG. the signal output through a teach procedure. A teach procedure offers for example the option to define that a completeness check is performed by the analysis device.

Within the scope of a completeness check the analysis device can, for example, check the presence of individual objects of another required design sequentially and produce characteristic output signals for the presence or absence of the requested objects. It is possible to insert an interface device, for example via an entry key, which allows the "in compliance" classification of certain objects that are missing.

It is also possible to conFIG. the system in such a manner that objects entering the observation area and objects equipped with an invention-relevant signal transmitter report to the analysis device within the scope of a reporting procedure (if applicable in connection with the generation of a reporting signal) and that the presence analysis is thus extended to the newly added objects. As soon as such objects arrive in the observation area, a warning signal can, for example, be produced.

In connection with this warning signal—or as an alternative to the latter—it is possible to generate an observation data batch, which records, for example, the exit time and the current GPS data.

It is possible to conFIG. the system in such a manner that the entry of certain objects and the identification of the latter results in a completeness analysis in a predefined scope. It is therefore possible to conFIG. the system insofar that for example the picking up of a wallet (which is equipped with the invention-relevant signal transmitter) results in the checking of the presence of a mobile phone, a wrist watch and certain other, also invention-relevant signal transmitter equipped items.

It is possible to execute a data transfer to and/or from the user-specific located receiver via area-specifically requested signal transmitters. Such area-specific receivers can be used, for example in a transition area. They can, for example, be coupled with a (house) door lock or with the door handle of a car. Contact with the elements stipulated or even just getting close to such system boundaries allows the assessment of the user's present equipment status as "in compliance", and if applicable record this equipment status externally, and to generate a warning or loss signal only if the equipment status changes. This makes it possible to for example generate a warning signal that is activated only in the event of loss (i.e. the removal from the observation area) of objects, for example after leaving a car. When crossing thresholds—for example a door—an object-specific data output can be produced, also via acoustic or optical signals, which for example determines which objects are located on the user, and which objects should be presumed to for example remain in the car. The invention-relevant system can also be utilized to record the time and presence of the user.

Storage devices can be used for interim archiving of the respective analysis results, whereby the storage location should preferably be at the location of the analysis device. Alternatively—or in combination with such an arrangement—it is possible, to provide storage devices in the location of the respective signal transmitters. For storage facilities located in the area of a signal transmitter the configuration data batch can also be provided in the form of a configuration key, for configuring upon entry into the observation area and, if applicable user-performed operations.

Definable codes in the area of the receiver, especially if the analysis device is coupled with the receiver, can be generated to provide an indicative analysis output signal based on the presence or absence of the object, and can thus be considered specifically in a signal processing visualization of the reception event. Thus the analysis device can initiate a special noticeable—object specific—"reminder signal", if for example a special valuable, piece of jewelry is initially removed from the observation area, especially also a valuable garment is placed into the custody of a coat check beyond the observation area, or an umbrella in placed in a respective stand. The permitted removal of certain objects equipped with a signal transmitter from the observation area can be authorized through active entry or also through the type of transfer of the objects. If for example the coat and umbrella are handed over simultaneously, or almost at the same time, the removal of these objects can be classified as permitted. As soon as one of these objects is returned to the observation area, a reminder signal can be activated for the object that is still missing.

The logical analysis of the signals received by the receiver and assessed by the analysis device can be performed through different, preferably user-customized strategies. To produce visual signals (for example by using the display of a mobile phone), it is possible, for instance, to conFIG. the invention-relevant system in such a way that it checks the presence of certain objects ("do I have the . . . with me?"). The analysis device can also be configured to instruct the system to check completeness ("have I forgotten anything?"), or the removal (in the event of loss or theft), or perform reminders (of temporarily removed objects, doors that have not been locked) via code providers AND receiver(s).

The system component containing the receiver can also be specifically protected by the system and can additionally secure an object that is easy to lose or to forget.

It is possible to forward a so-called handling code to the receiver via the signal transmitter provided on the respective object, for example a keychain, through a data-string or a code sequence (if applicable as an attachment, or as an integration sequence of the identification signal). Thus a connection to the receiver can receive data that is for example indicative of the fact that a key has been used to lock/unlock a door (in particular before it was placed in a pocket) or whether a certain equipment object is in a certain status (filling status, loading status, temperature . . . ).

The invention also refers to a system, system components of such as well as processes for the implementation of a data transfer while the user is present in one data transfer area.

In this context, the invention presented here refers to the implementation of an electronic data transfer, in particular in connection with the processing of FIGS. and value transactions as well as the purchase of goods or the exchange of merchandise, preferably for consumer applications. In particular the invention presented here refers to a system, components of this system and a process which, while a person, in particular a customer or consumer, is present in a display, promotion or cashier's area, a signal sequence is provided or exchanged which allows the processing of a payment transaction as well as the provision of ancillary, rebate or bonus services and/or manages support functions, or at least allows the coordination of such functions.

When purchasing goods in a store it is standard practice to pay for the items upon leaving the store at the cashier's checkout. It is a known fact that payback cards containing customer-specific data and or rebate or bonus service options can be presented in connection with the payment transaction. In their most simple versions, such cards are equipped with a barcode, which can be read by a barcode scanner, whereby additional data from a user database can be read with the assistance of this data sequence. There are also customer cards that are equipped with a data carrier, such as a magnetic strip, which can provide and record more detailed data. The presentation of the customer cards and the subsequent restoring of the latter in the wallet slows down the payment process. Especially when paying small amounts, customers frequently waive the use of the customer card, whereby customers then lose respective bonus or rebate offers.

The invention also addresses the problem of specific merchandise, such as alcoholic beverages, smoking paraphernalia and prescription drugs, which may only be purchased by specifically authorized persons, such as adults of legal age. Such merchandise causes problems because it can be obtained by unauthorized persons if given to them or transferred to them illegally, and that it may be impossible to verify how this happened and who initially purchased the merchandise.

In consideration of the above stipulations, the invention addresses yet another task by providing solutions that improve or secure the processing of merchandise in relation to the selection, the payment, or the transfer/handing over of merchandise, or the provision of services, and related obligations, services, verifications or coordination processes.

The present additional invention is based on a concept aiming at the generation of a signal via a customer specific data transfer device worn or carried close to the body, which can be coupled with a second data transfer device in the immediate vicinity of the customer, whereby on the basis of a signal-processing review of a reception event recorded by the second data transfer device a data batch is generated and a process related with the customer is coordinated by this data batch.

This allows the optimum processing of extensive product and customer specific data case-specifically in the course of a purchasing transaction at a cashier's checkout or at a merchandise display. Based on the transferred object or customer specific data the generation or the additional information content of output events can be determined optimally through application-optimized defined data processing procedures, whereby a preferred version of the invention also allows recording of data at the customer's end.

To this end, the term service refers in particular to the fulfillment of obligations, the provision of information, the provision of records, the control of coordination processes, the procurement of property as well as the provision of rebates, credit notes, incoming information or the implementation of operative readiness.

To solve the above task the invention presented here provides a system to implement a customer or application specific data transfer featuring:

at least one data transfer device to be carried by the customer to send and/or to receive a signal sequence, a second data transfer device associated with a communications area, also for the transmission and/or reception of a signal sequence, to and/or from the data transfer device to be carried by the customer, and at least one analysis device, which is coupled with one of the data transfer devices, for the generation of an output data batch based on a signal-processing visualization of the signal sequence exchanged through the characteristics of the signal frequency exchanged between the data transfer devices, whereby a process related to the customer or to the data transfer device carried by the customer, is coordinated.

The invention-relevant system includes at least one data transfer device to be carried by the customer or by the user to send and/or to receive an object or transmitter specific signal, a second data transfer device for the recording of a reception event, which contains the object or transmitter specific signal and an analysis device, which is coupled with the second data transfer device, for the generation of an output data batch based on a signal-processing visualization of the reception event determined by the characteristics of the object or transmitter specific signal.

To solve the above task, the invention presented here also provides a data transfer device for the invention-relevant system, whereby the data transfer device is a credit-card like device based on its exterior dimensions, containing a carrier element which contains a programming area, via which the customer and payback card typical data transfer can be implemented through a signal coupling with the user.

A respective card featuring the earlier described data transfer device provides also a solution for the task described at the beginning.

The invention also creates a cashier system for the implementation of customer card specific data transfer through a transfer device carried by the customer and integrated into the user card, whereby the cashier system contains a data transfer device located in the area of the cashier checkout system, which is also set up for the transmission and/or reception of a signal sequence to and/or from a user card defined data transfer device, and at least one analysis device which is coupled with one of the data transfer devices, for the generation of an output data batch based on a signal-processing visualization of the signal sequence, whereby based on the output data batch a user card defined data transfer device associated with the object in relation to the process, is coordinated.

Further details concerning the individual complexes of the inventions are covered by the respective sub-claims.

The invention can be utilized as described in the example, which is to serve as an example only, below:

A user carries a credit-card like card, hereinafter referred to as Signacard. This card is inserted into a wallet and can be carried close to the body by the user in this wallet or in other ways.

The Signacard includes a signal coupling link, via which signals can be coupled into the user based on, preferably, field-electrical interchange principles, which are under optimum circumstances, also readable. This Signacard may also feature other, possibly additional, interface features. The signal coupling link is connected with a preferably programmable signal processing switch circuit. By configuring the signal processing switch circuit card or user specific data may be made accessible. The energy requirements of the card can be satisfied by battery devices and/or energy absorption devices.

When the user equipped with an invention-relevant Signacard enters a store, the user can initiate a data transfer process by touching a reception area in the area of the product presentation, from which data provided in the Signacard can be read. Based on this data it is possible to provide the user with an offer tailored to the user via a display.

Once the user enters a cashier area with the selected merchandise, the data transfer can be processed upon a touch of the hand of a reception area located in the cashier checkout area, through which user-specific data can be read via the signal processing switch circuit incorporated in the Signacard. Based on this data a warranty certificate or an invoice with the address of the Signacard user can for example be generated, or an individual rebate calculated.

It is possible to conFIG. the Signacard and the system utilized for communications in such a way that within the Signacard data is recorded or processed, which is provided via cashier or stationary dialog systems, and which are preferably transferred to the user, who is acting as a transfer medium, to the Signacard.

In the case on hand it is for instance possible to store a data batch relating to the crediting of bonus points on the Signacard. These bonus points can be used for discounts on additional purchases.

The sensor surfaced referred to earlier are a part of an interface, via which a data dialog with the Signacard can be performed, using the user as a transfer organ. The signals coupled into the sensor surfaces can be filtered via a signal processing device and transformed into a standard data format.

Further data processing can be performed by re-accessing accounting programs, preferably with archiving of data in a memory accessible via linkage system. Optimally, cashier checkouts or data processing systems in different locations have access to this memory, if applicable through different authorization levels.

The invention-relevant Signacard is also especially suitable for the provision of authorization verifications, for example for the controlled sale of alcoholic beverages, smoking paraphernalia or the pick up of films/videos. It is possible to equip a cigarette vending machine with a sensor surface, which allows a data exchange via touch contact using the invention-relevant Signacard. Based on this data exchange it is possible the verify the legality of the smoking materials sale. It is possible to, based on the data exchanged, render the cigarette box for example with user specific markings through a printing device. It is also possible to store the package number together with the user data. If merchandise monitored in this fashion ends up in the hands of unauthorized individuals, such as minors, it is possible to determine who the initial buyer was.

By just carrying the invention-relevant Signacard, it is possible to coordinate the individual sales, operation or rebate conditions as they apply to the respective user. These rebate conditions can be optimized via preferably centrally stored user specific consumer behavior pattern data.

Plastic cards have been a low-cost and widely accepted method to create customer loyalty for quite some time. Besides identifying consumers, some can also store data (Smartcards). (Expensive) card systems are frequently used to get information on the behavior of consumers (CRM); a gigantic market is developing. The goal is to increase the convenience of these cards and to make their use in practical business transactions more versatile and more selective.

In the past it has been possible to verify the relationship between buyer/product only via the actual purchase, either when the card was used as mode of payment or (in the event of cash payment) via cards as customer loyalty instruments by offering rebates. The abolishment of the rebate statute and the European Euro market, however, demand extensive measures and, most importantly, more distinguishing characteristics in terms of convenience and service. The invention-relevant Signacard provides this solution. It is the ideal combination of old and new economy and the first fully functional response to the demands of "permission marketing", whereby the customer decides on which products and via which channels he/she would like to receive information. Special and legally protected advantages aim at making Signacards attractive and coveted in the eyes of consumers.

Convenience: Signacards do not have to be shown or placed into slots, they remain in the carrying device or garment (pants, coat, wallet=wearable computing), the identification of a person can be achieved through touching sensor points with the index finger.

Selection: sensor points can be installed at cashiers' checkouts, but also on products or in the area of promotions or sales shelves. The thus created haptic approach of a product has a much greater impact on the memory than a purely visual approach. It is possible to record the customer, the product, the location and the occasion simultaneously and to process the thus obtained data.

Feedback: by touching a sensor or recording surface, a positive feedback to a medium potentially selected by a consumer (monitor, cell phone, SMS, PC) can be initialized. It is also possible to personify pricing based on the data that can be transferred via the invention-relevant card and to award points based on time, purchase intervals, brand loyalty etc.

Security: Signacards can be configured in such a way that they contain only a (customer) ID number, no personal or mobility data.

The invention-relevant Signacard allows the provision of a loss prevention system via which a presence observation of objects in the vicinity of the user can, for example, be performed. The contents of the German patent application 102 22 859.0 is herewith incorporated through reference.

In an especially beneficial way, thanks to the invention-relevant card, the user can be identified during self-controlled selective acts in real business transactions. This makes it possible to inform the user on potentially relevant events, merchandise and services relating to user requests and to obtain relevant feedback. These actions are initiated by the customer, who carries his/her Signacard with him/her and touches a sensor point. No computer or other special skills are required: the customer simply touches things he/she is interested in with the index finger.

In automotive, home and work applications, the Signacard can replace keys (keyless entry). The performance features of the Signacard can be integrated into other card systems. The manufacturing costs can potentially be far lower than those of the Smartcard.

Based on yet another feature of the invention, it relates to yet another designed system and process for the implementation of a data transfer, in particular for authorization identification.

The invention presented here refers in this additional application generally to a system and a process for the implementation of a data transfer, in particular for the authorization identification, for example within the scope of an authorization query.

Authorization identifications or queries are, for example, used in credit card or key systems, where the content of a data sequence is analyzed, whereby the analytical results determine whether and to what extent data transfer procedures may be performed or may be declared authorized.

Such authorization identifications can be part of in particular automotive applications in door locks and/or motor start switches. Authorization identifications are also common in electronic payment systems (for example credit card payment) or systems for time recording or for the verification of access authorization.

In applications of switch systems for the implementation of authorization identification processes in autos, for example for the remote-controlled modification of the lock position of vehicle doors, the simplest method is the data exchange between a user key switch carried by the user and for example a switch in the vehicle. The signal exchange can be performed acoustically, electro-magnetically or, in particular, optically—wirelessly or without contact.

Known key systems come with the problem that in the event of unauthorized access to the key switch (data transfer devices, such as credit card, key card, door remote lock key), the key can be used by unauthorized parties, especially if the loss is detected too late.

In the latter scenario it is the purpose of the invention to provide solutions, which secure the authorization to use key systems more reliably.

The invention solves this problem through a system encompassing a data transfer device to be carried by the user for the generation of a signal sequence that can be read by the reception system an accompanying device, also to be carried by the user whereby the data transfer device and the accompanying device are designed and configured in such a way that depending on whether the data transfer device as well as the accompanying device are within the vicinity of the user, the signal sequence can be classified This ensures in an optimal way that the signal processing procedure initiated by the signal sequence can be processed in such a way that it can be taken into account whether the accompanying device is also in the vicinity of the user when the data transfer device is being used. It is also possible to lock the data transfer device, so that it can no longer be used, except if additional authorization verification is provided—for example, manual PIN number entry.

This allows the optimum prevention of unauthorized use of the data transfer device.

This invention is particularly advantageous if used in door locks of cars, motor start switches, as well as in the processing of non-cash payment transactions.

The accompanying device and the data transfer device are preferably designed in such a ways that a signal transfer between both is possible.

The data transfer device includes preferably a data processing switch.

The accompanying device includes preferably a signal transmitter.

The signal transmission between the accompanying device and the data transfer device is preferably performed via the coupling of a signal with the user.

Depending on the intensity of the signal transferred between the data transfer device and the accompanying device, it is preferably analyzed whether both devices are in the vicinity of the user.

Preferably the accompanying device has the ability to generate a signal that puts the data transfer device in a status to transmit a signal sequence that can be classified as authorized.

The accompanying device and the data transfer device are preferably part of a system that performs a presence analysis or presence analyses.

The accompanying device is preferably integrated into a mobile phone. It is also possible to integrate the accompanying device into a card element or into another user device.

Optimally, the data transfer device is integrated into a vehicle key device.

The data transfer device can be optimally integrated into a credit card. This credit card is preferably suspended for use if it is removed from the user area defined by the presence of the accompanying device. Preferably, the suspension criteria or the suspension effect are configurable. It is possible to con-FIG. the credit card in such a way that the number of uses or the transaction amounts can be limited, if it is removed from the user area defined by the presence of the accompanying device.

Car key devices are preferably configurable in such a way that the effect of the key is limited when it is outside of the area classifiable as the presence area of the user.

The signal transfer between the accompanying device and the data transfer device is preferably performed based on electrostatic counter effects.

Preferably the accompanying device features an electrode connection for the coupling of a signal into the user.

BRIEF DESCRIPTION OF THE DRAWING

Additional information on the invention presented here can be found in the following description and in the attached drawings. Therein.

DESCRIPTION OF THE PREFERRED EMBODIMENTS

The following describes the invention presented here based on a system for the prevention of the unnoticed loss of objects, which are usually carried by system users on their persons.

The objects to be observed have been equipped with a signal transmitter for this purpose, which couples respective signals into the human body or the latter's clothing preferably through low frequency area capacitive (static) signals via charge exchange. A receiver in the vicinity of the user's body records the signal coupled into the body and transfers this signal to a suitable analysis device. This analysis device preferably expects a certain signal within pre-defined periods of time. If this signal is not received, a respective warning is sent to the user, either acoustically, optically and/or, for example, through vibrations. Preferably the signal transmitter is permanently installed or integrated into the object to be observed, for example a valuable. Through the connection of a respective signal transmitter with a wallet, for example, the loss of the latter can be prevented. The receiver used to record the signals generated by the signal transmitter, as well as the connected components required for the generation of the loss signal can either be an autonomous receiver or, for example, integrated into a mobile phone or into a wrist watch. The signal transmitter can be provided in a credit-card like form, and can be inserted into the respective compartments of a wallet without expert knowledge for the purpose of installation.

Figure 1:
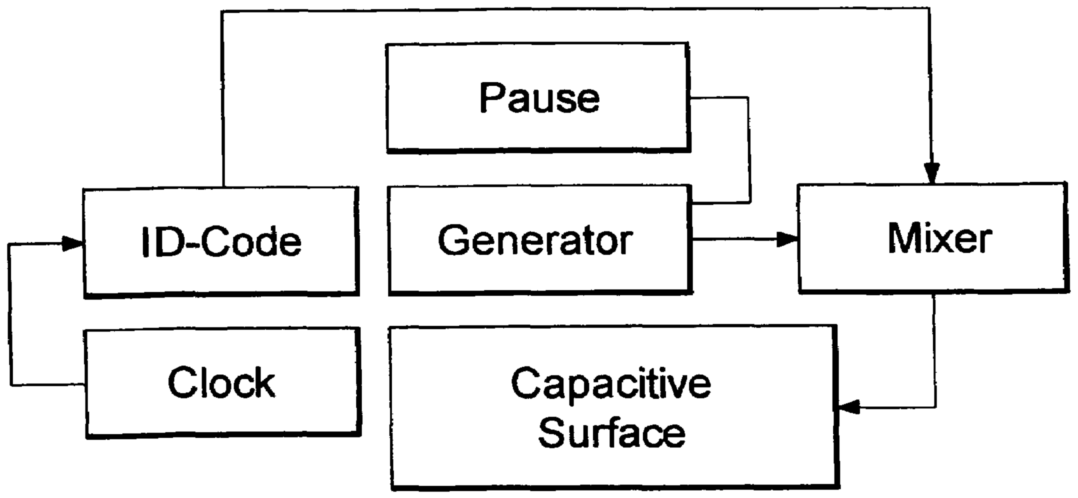
FIG. 1 is a schematic diagram showing the operative links between individual function groups of a signal transmitter.

FIG. 1 shows a schematic of the signal transmitter that has a capacitive surface 1, a mixer 2, an identity code generator 3, a clock pulse generator 4, and a suppressor 6 coupled with the frequency generator 5.

A thus structured signal transmitter can, for example, generate a code signal in successive periodic intervals (for ex. 3× per second), which is transferred to the capacitive surface 1. In the most basic scenario, this code signal is produced only by the frequency generator 5. In addition, a digital data signal (which may, for example, contain an identification number) may be attached. Alternatively, or in combination with this solution, it is possible to provide discrete signals via the identity code generator 3 shown here in the form of a "melody" on various frequencies. A collision of signals generated by several such signal transmitters can be adequately prevented by ensuring that the signal transmitters either work on different frequencies and/or that the send/pause ratio is set such that collisions are virtually impossible or that they at least happen very rarely. Utilizing a system of irregular breaks the probability of collisions caused by signals being transmitted by various signal transmitters can also be reduced. The signals thus generated are preferably coupled via the capacitive surface in the system users shown here, in particular in his or her body and/or clothing, provided the capacitive surface 1 is adequately close to the system user.

Figure 2:
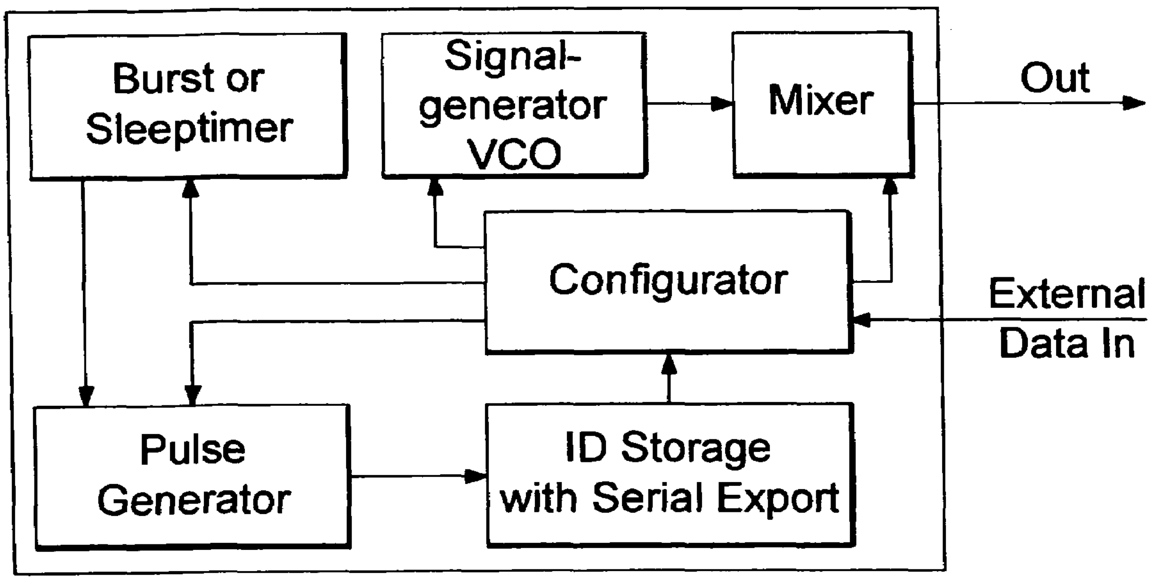
FIG. 2 is another schematic visualization explaining the internal architecture of a signal generating device associated with a signal transmitter.

FIG. 2 shows the architecture of an electronic switch circuit to be installed near the respective signal transmitter, which allows the inductive and capacitive generation of the signals coupled into the user. The sequence shown here to be installed into the area of the signal transmitter also includes the mixer 2 shown in FIG. 1, a configurator 7, a signal generator 8, a burst or sleep timer 9, a sequence provider 10 and an ID memory 11 with serial output. The sum signals created by mixer 2, configurator 7 and the signal generator 8 can be transferred directly on the skin of the user via a capacitive surface, optically via light or laser as well as inductively via a wire. The component group of the signal transmission device to be installed for signal generation includes, in its most basic design, a signal generator in the form of an oscillator that produces a permanent or pulsating frequency with break intervals.

If several signal transmitters are used, a differentiation between the respective generated signals can be achieved by using different permanent frequencies and/or through the duration of individual frequency bands and/or the duration of the breaks in between.

In an expanded version the output frequency or output frequencies can be modulated with digital information (AM-FM, etc. modulation). It is possible to for example send out an identifying characteristic in successive repetition, whereby the exchanged data strings can also be encoded, so that the form of these data strings changes all the time. The structure shown in FIG. 2 allows several versions in terms of signal production and modulation.

A central component in this design is the configurator 7, which in an optimum setup allows the definition of the switch arrangement shown here and which puts the individual function groups into the desired operation modes. Configurator 7 can, for example define the transmission frequency or frequencies of the signal generator 8, whereby these signal transmission frequencies can also change during a transmission (hopping). To for example achieve a cyclic output of a characteristic, it can be stored in the ID memory 11 (for example push register set up as a ring counter) and transferred by configurator 7 to mixer 2 (modulator) via a sequence provider 10 (single shot, e.g. Monoflop), depending on whether it is configured as amplitudes or frequency modulation. In the latter case the frequency of the signal generator 8 can be changed, for example in dependence on a bit value (1 or 0). In addition to the ID characteristics, external data can also be incorporated into the component bit by bit and transmitted. To this end, a receiver that reacts to the ID can, for example transfer these characteristics to an external system. Prior to sending out a sequence, configurator 7 can give out a defined start signal, which allows a receiver to go into a reliable signal recording adequate start position, enabling it to correctly classify the received signals.

After a complete signal, especially data sequence, has been put out by mixer 2, configurator 7 can be instructed by sleep timer 9 to take the entire component group or at least several components of the latter off of electrical power for a certain period of time. Preferably, this break is considerably longer than the time of signal transmission. This cuts down the consumption of electricity on the one hand (important for battery operation) and, on the other hand, enables other signal transmitters provided on additional objects to send out their signals sufficiently collision-free. The breaks can be inserted randomly, so that even in the event of the collision of transmitted data, the collision does not likely reoccur in the next cycle. A typical impulse/break ratio is, for example 1 to 100. It is possible to generate a test sum for each transmission sequence via the configurator, which allows the testing of the received signals in terms of possible errors therein.

The following table shows the components of the described signal generator in the context of their tasks and characteristics:

| Component | Tasks | Characteristics |
|---|---|---|
| Signal generator VCO | Variable carrier frequency | Programmable function generator |
| ID memory with serial output | Definitive identification | Push register acting as ring counter |
| mixer | Modulates the load driver | Analog Und-switch |
| Configurator | Dynamic control | Programmable |
| Burst/sleep timer | Dynamic bursts, power down | Mono-stable, variable burst |

-continued

| Component | Tasks | Characteristics |
|---|---|---|
| Sequence provider | Shifts ID (one shot one-by-one) | Star/Stop = impulses/break 1/50 |
| Substrate | Minus to electrical power | Creates capacitive counter pole |

Physical Designs of Code Signal Generators

To reach a receiver (description follows) via a user the signal transmitter preferably feeds a signal directly into the contact location via a pole or indirectly via a capacitive surface into the user from a distance of several centimeters. As a counter pole, parasite capacities that develop in the transmitter and the user can be utilized (e.g. via ground, body, etc.).

The signal and Id can also be transmitted optically (laser, LED, IR, etc.), acoustically (sound, ultra sound, ITC) or inductively (diffusion field, coupler, etc.). The described signal transmission approaches can also be combined.

Preferably, the signal transmitter includes a power supply, which can, for example, be a battery. The sleep timer 9, which is preferably integrated into the signal transmitter, allows a long period of operation, because the power supply can be switched off by the sleep timer between signal sequences.

According to an especially preferred design of the invention the power supply or at least a portion of the power supply can be a solar cell.

The signal transmitter according to the invention may be integrated into buttons, key chains, stickers or credit cards.

In particular in terms of the receiver described later it is possible, to embody the function components of this system by using switch circuits of electronic devices. The invention-relevant receiver can, for example, be realized through the function groups slated for use in a mobile phone.

The ID number preferably generated by the ID memory 11 is preferably definitive. This allows the definitive identification of the object associated with the signal transmitter. The invention-relevant signal transmitter can be integrated as a code signal generator into a push button type element, which can easily be attached to garments, valuables and equipment. This makes it possible to determine through the inventive presence analysis system, whether the system user is dressed as required—e.g. whether the user wears protective clothing and if any required accessories are near the user.

Figure 3:
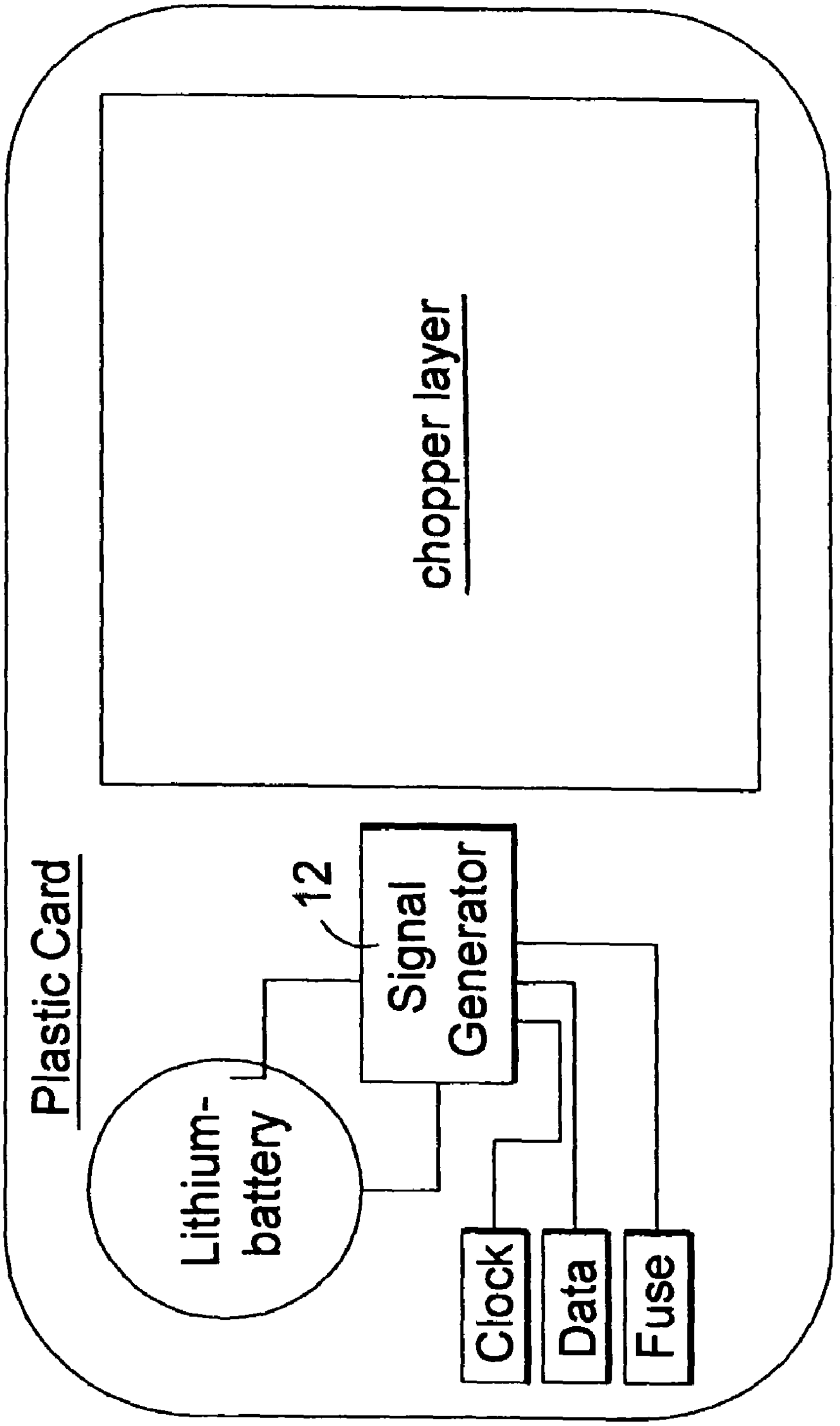
FIG. 3 is a schematic visualization illustrations the construction of a signal transmitter integrated into a basic credit-card style form.

FIG. 3 shows a design version of the invention-relevant signal transmitter as a credit card like element. This signal transmitter includes a capacitive surface made from copper foil, which is located on a large area of the credit card like element. This capacitive surface communicates with a signal generator 12, which may be designed as a switch described above in relation to FIGS. 1 and 2. In this design example, the power supply of signal generator 12 and the connected additional function components is sourced from a flat battery 13, which in this case, is provided in the form of a lithium battery.

The signal transmitter described here is designed as a flat customer card, whereby the signal is transmitted via the copper foil capacitive surface 1. The loss of, for example, a brief case containing important documents, of a wallet containing money and credit cards, can be recorded instantly, if the brief case of wallet is equipped with such a signal transmitter.

Figure 4A:
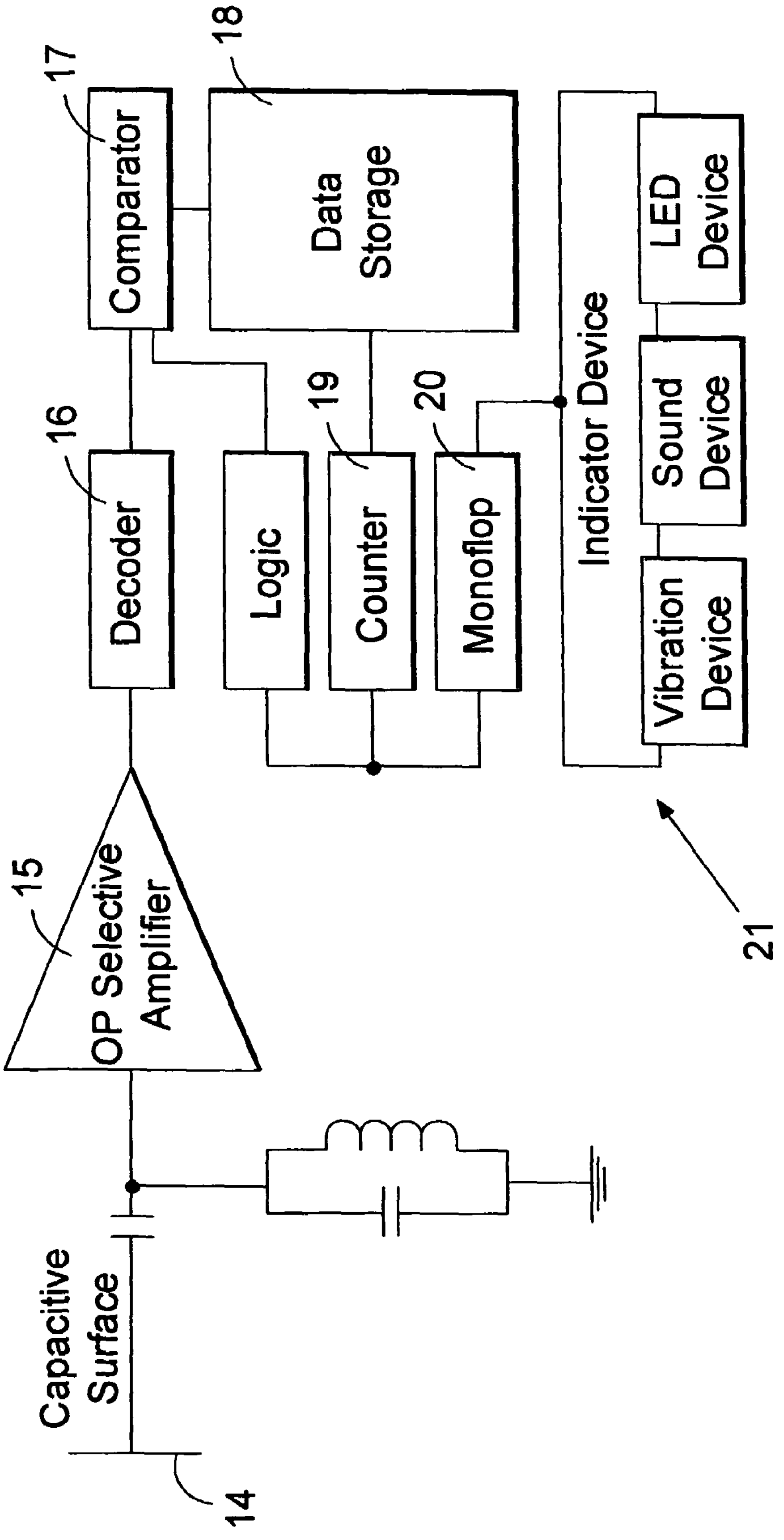
FIG. 4*a* is a schematic diagram showing the construction of a preferred design form of a receiver as well as an analysis device coupled therewith.

FIG. 4*a* shows the structure of a preferred design version of such a signal transmitter with a connected analysis device.

The receiver includes a capacitive surface 14, which is coupled with a decoder 16 via an operation amplifier 15. The operation amplifier 15 receives the incoming signal from capacitive surface 14, which is usually of low intensity and amplifies it in such a manner that it can be processed by the decoder 16. Decoder 16 produces, for example a FIG. value corresponding with the frequency of the recorded signals (in the most basic design version) or decodes a data string modulated onto the frequency, especially an identification code modulated onto the frequency. A comparer 17 determines, whether the analyzed value exists already. If this value does not yet exist, it is stored in an available memory unit. A increment counter 19 selects the next available memory unit and remains in this location until further notice once it has entered a newly identified value.

In this design version, upon incrementing the counter, a post-trigger-ready Monoflop 20 is initiated. Upon receiving the next signal, the earlier described comparer determines, whether this value has already been recorded, and, if applicable, increments counter 19, which then points to the next memory unit and thus post triggers the Monoflop. If there is an empty memory unit, the counter increments automatically until it once again points at a memory unit occupied by a value. This sequencing allows the monitoring of several anticipated values from different signal transmitters using just one Monoflop 20.

Reporting Device

If an expected signal does not arrive, the Monoflop does not perform the post triggering process and it returns to the original position after the preset time has expired. In doing so, it initiates two functions. First, the relevant memory unit in memory bank 18 is deleted. Second, signal generator 21 is activated, which can produce acoustical, optical and/or haptically recognizable signals, such as vibrations. The thus generated reporting signals can be generated in such a way that they identify which signal transmitter or which connected object has just been removed from the immediate vicinity of the system user.

The digital functions of the earlier described receiver as well as the data consolidation connected analysis device can preferable be controlled via a micro controller or another logical component.

Application Examples

The signal transmitter designed as signal generator units can, for example, come in the form of plastic cards to be carried in wallets or brief cases, as key chain attachments for car and/or house keys, as well as stickers from attachment to valuables, such as cameras, camcorders and mobile phones. The receiver intended for the reception and analysis of the signals can be a small device, which can be carried in the belt buckle of the user. It is possible to also make the utilization of the invention-relevant system visible through an easily identifiable design element, whereby this design element may, for example incorporate the receiver. Such, for example, button-designs of signal transmission or signal receivers, may for example, be handed out to tourists during travel events. Pick pockets recognize that they are at a much higher risk of getting caught when they see tourists are equipped with such devices, because a theft of an object secured by the invention-relevant system would be detected immediately.

Optimally, the invention-relevant receiver is installed in a mobile phone or in a wrist watch. In the case of a mobile phone, it can, for example, make use of the already present call signalization device (ringer, vibration generator). It is also possible to use the alarms in watches when integrating the invention-relevant receiver. The invention-relevant system is preferably aligned in such a way that an alarm signal is already activated when the object equipped with the signal transmitter is detected to be more than 15 cm from the user's body for a time exceeding 1.5 seconds. The distance of the signal receiver from the body of the user that exceeds a predefined distance of, for example, half a meter, should also initiate an alarm signal.

Figure 4B:
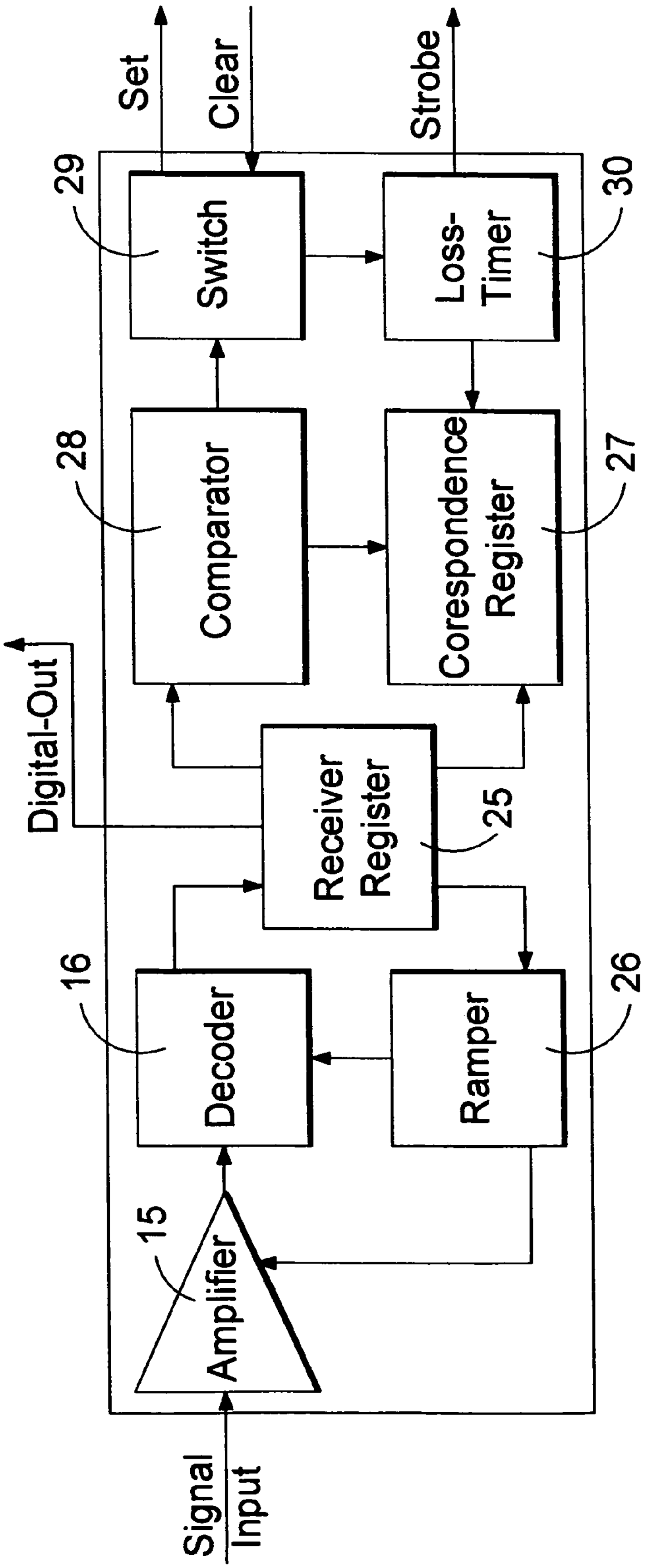
FIG. 4*b* is a schematic diagram showing a preferred architecture of the analysis device.

FIG. 4*b* shows another structure of an invention-relevant receiver with a connected analysis device. The switch control shown in FIG. 4*b* includes an operation amplifier 15, which records, for example a receiver created as a capacitive surface via a highly amplified active band pass and transfers it to a sound decoder 16. This operation amplifier makes it possible to virtually suppress always present humming noises and to only feed respectively filtered signals into the sound decoder. The sound decoder 16 can either detect a fixed analysis frequency (usually adjustable via an RC component) or a frequency determined by a ramp generator (analog or digital), which then would stop the ramp generator in this position. In the former case, this allows the measuring of the presence and the duration of signals, while the latter case additionally allows the detection of the utilized frequencies. In the first case, this can be achieved via a simple on/off function. In the other case, the signals are transferred to system that processes them (micro controller), and which also controls the operation of the ramp generator. A second, enhanced version features components that can process the received signals autonomously.

Reception register 25 takes on the role of the central control of the switch control shown here. First, using ramper 26 (for example a D-A-modulator or a digital potentiometer), it adjusts the sound decoder to an agreed-upon frequency and remains in suspension until a start signal is detected (the signal amplifier of the input amplifier 14 can also be adjusted via ramper 26 in this case, auto gain is possible). If this is the case, the reception buffer is filled bit by bit and a test sum is created. This test sum must correspond with the test sum of the transmission signal sent along with a sequence in a specific location before the sequence, which consists of several bytes, can be processed as follows:

A certain (or definable) byte contains a 4-bit control instruction and a 4-bit-memory unit selection in the correspondence register 27 (which is equal to 16 memory units of 24 bits each, other versions with more or fewer memories are possible also). The thus selected memory unit is then switched to comparer 28. Comparer 28 compares the bit pattern contained in the memory unit with a pattern from the reception buffer, which represents the signal generator identification number. In is the event of compliance, a control instruction is generated. The data contained in correspondence register 27 are not fleeting in this kind of design, once they have been entered they can preferably not be altered or only be altered in connection with an authorization verification. The control instructions will be explained in more detail later. There are, for example, instructions, that in the event of code compliance get the switch 29 to access the exit SET. This status remains intact until it is changed by another control code or by an exterior clear impulse. A control instruction causes lost timer 30 to ensure that the code stored in the selected correspondence register 27 is again received within one second. If this is not the case, the strobe inlet causes the output of a gage and the set inlet is switched back.

The invention is not limited to the above-described design examples. The logical processing of the analytical results of the analysis device can, for example also be performed in configurations other than the ones explained earlier and tailored specifically to the case.

Figure 5:
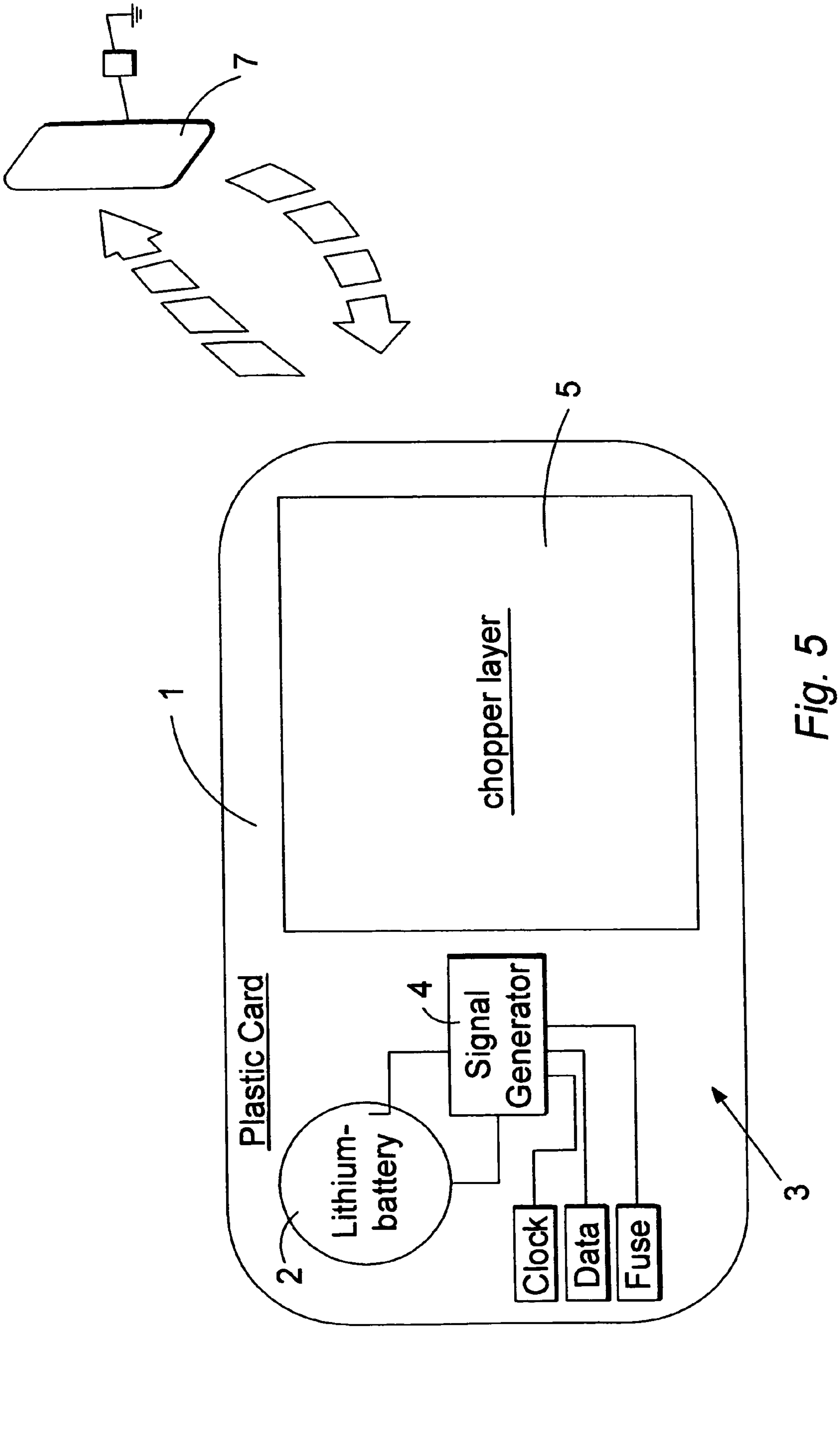
FIG. 5 is a customer card designed a credit-card style customer card according to the invention for the processing of a data transfer coupling a signal sequence into the card user.

More details concerning the here presented invention can be derived from the following description relating in particular to FIG. 5 of the attached drawings.

The card shown includes a base corpus 1 featuring credit-card like exterior dimensions. An electronic switch 3 is integrated into base corpus 1, which is coupled to a power supply device 2.

The switch 3 includes a signal generation device named signal generator 4 in this particular case, which generates a card-specific signal sequence. Signal generator 4 communicates with a signal coupling device 5. Signal coupling device 5 is designed in such a way that it allows a coupling of the signal sequence into the user based on field-electrical counter effects through its interplay with signal generator 4.

This design example features signal coupling device 5 as a surface electrode. The power and frequency characteristics are aligned in such a way that they are considered risk free under emv criteria as well as physiological aspects.

Signal generator 4 can be configured in such a way that it initiates one data output only.

It is also possible to design and configure the signal generator in such a way that it also allows data recording and in particular a full duplex data dialog.

A programmable configurable computer device may be installed into the area of signal generator 4, which can also and especially process an encoded data exchange.

Thanks to the invention-relevant card it is possible to place the card holder carrying the card into a status, in which by simply touching a coupling surface a data transfer between the user's card and another dialog system is possible. Based on this data transfer a wide variety of processes can be coordinated.

The signal transfer is processed by coupling the signal sequence into the user. The user thus becomes a part of a signal transmission path, which can be closed intuitively, for example via a point motion directed at reception surface 7. The signal sequence may be configured as a pulse sequence, whereby the pulse duration and/or the pulse intervals can represent a digital data pattern.

Figure 6:
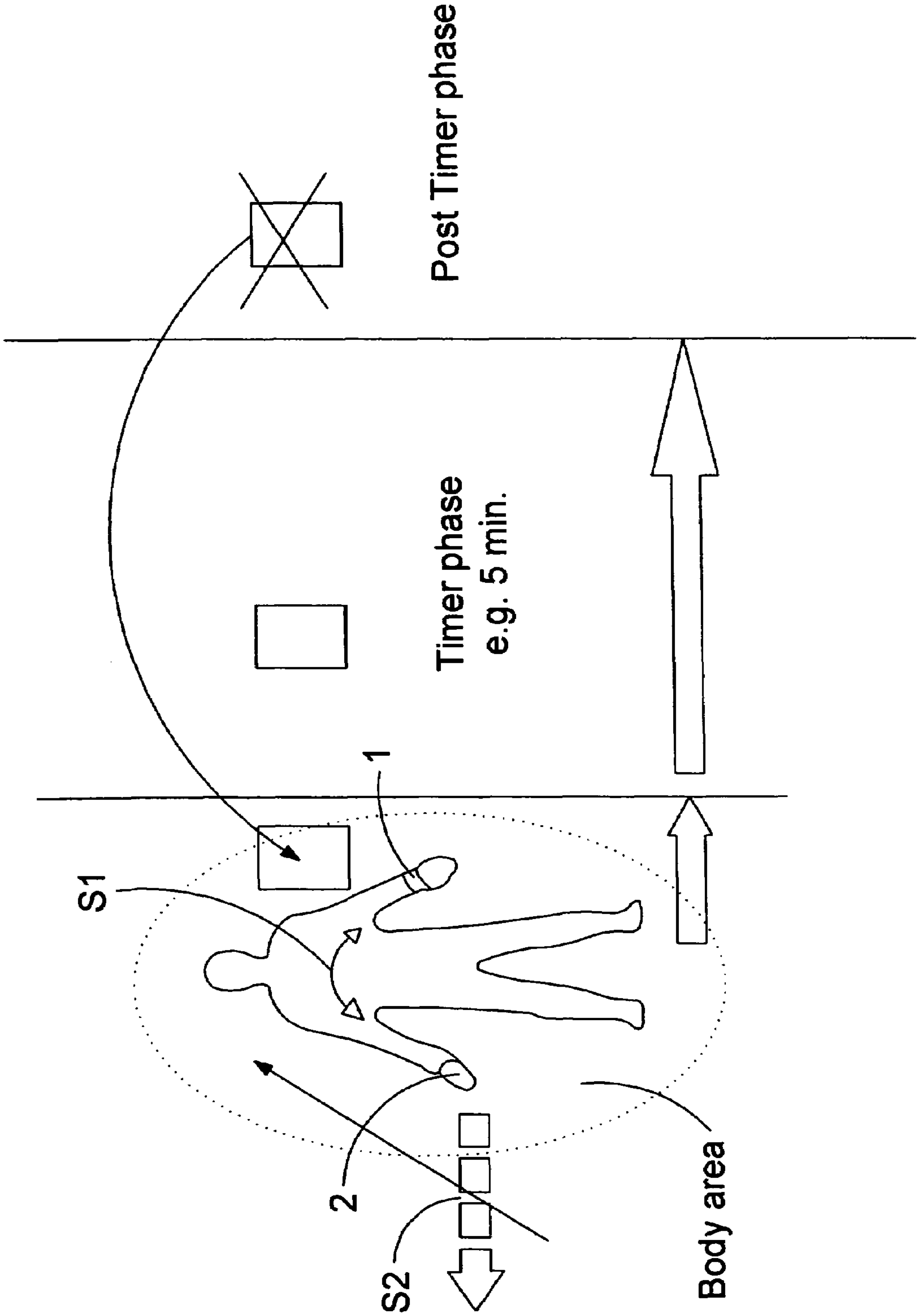
FIG. 6 is a schematic representation of the system according to the invention.

FIG. 6 shows a user equipped with an integrated accompanying device 1, in this case a wrist watch.

This accompanying device makes it possible to couple a preferably encoded signal into the user.

This signal can be recorded by a data transfer device 2 in the vicinity of the user, as long as the device remains in the vicinity of the user.

For the purpose of an example, the data transfer device in this case comes in the from of a credit card element, which can, for instance, be used a key device for an auto door lock system and/or as a check card for cashless payments, as an access authorization pass or similar applications.

The data transfer device is equipped with an interface device, via which a data sequence generated by the data transfer device can be generated.

Depending on whether a signal transfer of a signal suitable for a presence observation can or cannot be done via the user or via the mutual vicinity of the accompanying device 1 and the data transfer device 2, the configuration status of the data transfer device 2 is determined.

It is possible to design data transfer device 2 in such a way that it generates a signal sequence to be transferred to an external reception system (vehicle installed system components, payment systems) only—or sufficiently only—if a predefined dialog requirement with the user carried accompanying device is still being fulfilled.

The dialog requirement can be tailored to the respective requirements, so that for example a suspension or function restriction is initiated only after the expiration of a predefined holding period. It is also possible, to make the content of the signal sequence to be generated by the data transfer device contingent on whether a defined presence criteria of data transfer device 2 and at least one additional accompanying device 1 is fulfilled.

It is possible to provide authorization relevant data in the accompanying device 1, so that the generation of the signal sequence to be performed by the data transfer device and to be provided to the external system is performed upon comparison with the data stored in the accompanying device.

The user-internal signal transfer S 1 between the accompanying device 1 and the data transfer device 2 is done for the purpose of presence observation, i.e. the verification of whether both system components 1 and 2 are in the vicinity of the user.

Signal sequence 2 which is to be, possibly selectively, transmitted by the data transfer device 2, is preferably transmitted in the key sequence, which allows the initiation of modifications to the locking status of the vehicle door, or a payment transaction.

Data transfer device 2 can be configured in such a way, that the key sequence S 2 to be generated thereby hinges on the presence of both system components 1 and 2.

The accompanying device 1 can be designed in such a way that it indicates the absence of data transfer device 2. The accompanying device can also be integrated into other equipment objects or be used for the monitoring of the presence of additional objects.

Data transfer device 2 can be designed in such a way that it expects a signal sequence 1 from accompanying device 1 within a predefined time interval. It is also possible to design accompanying device 1 in such a way that it expects signals from data transfer device 2 in predefined time intervals and that it generates a release signal only after it has received an authorized reception event.

Figure 7:
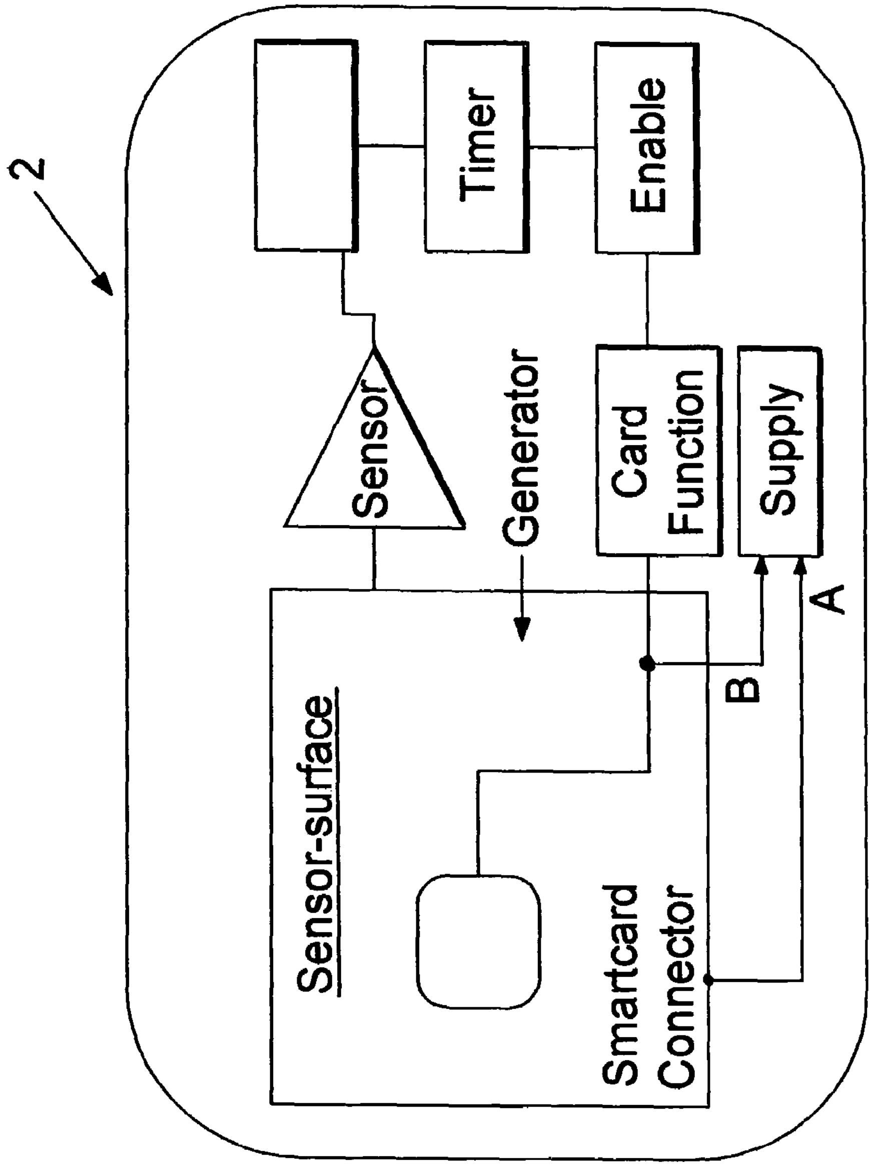
FIG. 7 is a schematic diagram showing a preferred design form of the data transfer device in accordance with the invention.

FIG. 7 shows a design version of data transfer device 2 that can for example be used as a self-suspending credit card/check card or as a function limiting car key.

Other aspects of the here presented invention can be derived from the following concept description.

Basic Idea

Key signal transfer devices, credit cards or cards carrying personal information are suspended by definition, for example directly or after a defined brief period of time, if misused, if they are no longer in the direct vicinity of the holder. This provides an additional safety aspect in particular for keyless entry systems used in cars.

Design

This for example card-like design of a data transfer device, which in the following is referred to as a card, includes a conducting foil (e.g. copper) as a capacitive surface. An accompanying device, hereinafter referred to as a provider, which is worn on the body, feeds a data string, which changes all the time and modulated in a carrier frequency, into this provider. A sensor in the card receives the signal, decodes it and starts a programmable timer, which releases the "normal" card function for a specific period of time (usually a few minutes). If the card is removed from the holder, this release signal is suspended. Upon expiration of the timer period, the card is suspended. An integrated provider now transmits a suspension code via the surface, which can be received by a basic reading device. This also allows the protection of cards with magnetic strips.

The provider on the card can also be used to confirm the incoming signals in such a way that the holder can monitor is the presence of the card, for example, through a light signal (LED, etc.) on a receiver (for example a watch). Moreover, the card provider can be modulated with an identifiable signal, which can initiated switch processes in various receivers (from simple locking processes to owner verification).

This signal may be autonomous from the card function, however, it is possible to identify the holder (no contact member ship pass, customer card, etc.). It is furthermore possible to create a combination signal, which can only be processed in cooperation with the signals of the body provider (accompanying device). The initial design of the body providers should ensure that they can be carried without the risk of loss, i.e. on belts, in watches, rings, shoe inserts, buttons, etc.

Receiver

The sensor on the card must be in a position to receive, amplify, decode and analyze a signal modulated with data, in a capacitive location on the conductor surface (of a body provider). Contrary to transponders, no high frequency energy transfers are required in this case. This could be an alternative in the event that it should be established that electromagnetic radiation close to the body can created health hazards.

Timer

The delay of several minutes prior to the initiation of a card suspension after the card has been outside of the holder's vicinity (aura), can be practical, for example in restaurants, where it is used to pay the bill. However, reading devices can also be set up in such a way that they are carried to the guest, so that the user does not have to surrender his/her card. At cashiers' checkouts, terminals, communication devices, etc., it is, however, common to hand over the card for short periods of time. In the future, the card-internal provider signal could also be used for identification purposes. In this case, the card can remain the (pant, jacket or coat) pocket.

In this case, the holder merely has to touch a sensor. If the card is misused, the timer activates the suspension code. For perpetrators, this greatly increases the risk of detection of such misuse. The timer also provides information on how much time has passed since the card has been triggered by the body provider of the holder. On the other hand, in the event of utilization in compliance with the authorized third party time period, the timer can also send out a signal via the internal provider confirming this authorized use. The lack of signals could thus result in the determination that the card has been manipulated.

Capacity Supply

Rechargeable batteries or "Goldcaps" can be supplied with energy if the card maintains a capacitive exchange area. It is of course also possible to charge accumulators via a contact surface.

"Friction Charging"

A special version of energy provision uses the plastic material of the card to recharge the internal energy storage. Rubbing the card with a (cotton, silk, etc.) piece of cloth, the card is statically charged.

This charge also appears on the capacitive surface on the card's interior. As of a certain voltage level, it could release its charge via a lock (e.g. diode, high side switch, etc.) into a condenser that supplies energy to the low-consumption (CMOS) logic.

Determination of the Coupling Capacity

Given that the surface of the card conductor foil is constant, as is the output gage of the body provider, the distance of the card from the body of the holder results in the development of alternate current resistance, which increases as the card is moved further and further away. It is thus possible to send a warning message "just in time" before the card is removed from the user's vicinity.

Gage Increase During Transmission

To ensure a safe reception of the internal provider, it can increase its transmission gage to a level that considerably exceeds the level of the power supply voltage. To achieve this, two condensers are initially switched parallel. An electronic switch switches them in sequence once charging is complete, so that nearly double the voltage is developed. This voltage is then switched to a third condenser.

Contrary to a (familiar) cascade, the first condensers are now again switched in parallel and subsequently charged with the double voltage of the third condenser and so on. Thus an increased voltage can be produced using just three condensers, depending on the number of switch processes.

Forgotten Code Providers

It is of course possible to forget a body code provider, causing the card to send a suspension code. Given that the suspension code also includes an identification code, the legal owner only has to provide the correct identification (or password to the call center, etc.) to be able to utilize at least limited functions of the card. An unauthorized user will very likely never identify him or herself.

The invention claimed is:

1. A system for monitoring the presence or absence of objects, the system comprising:

respective transmitters on the objects to be monitored for transmitting respective object signals specific to respective ones of the objects or to the transmitters;

a GPS-equipped mobile telephone having a receiver for defining with the transmitters an observation areas in which signals outputted by the transmitters can be received by the receiver and outside of which signals outputted by the transmitters cannot be received by the receiver and for thereby receiving signals including the a one of the object signals only when the respective transmitter is inside the observation area;

analysis means in the telephone and coupled with the receiver for, based on the signals received by the receiver, generating output signals indicating the presence or absence of the objects and their transmitters in the observation area, for determining when objects equipped with the transmitters enter the observation area, and for determining when one of the objects leaves the observation area and generating a data set indicating when the object left the respective observation area and the GPS location of the receiver when the object left the respective observation area; and an output device in the telephone for the output of the presence or absence output signal via acoustic, optical or haptic means.

2. The system defined in claim 1 wherein the object signals outputted by the transmitters each include a respective data string.

3. The system defined in claim 2 wherein the data strings each include an identification code unique to the respective transmitter.

4. The system defined in claim 2 wherein the transmitted object signals are at least overlay free.

5. The system defined in claim 1 wherein the receiver includes a trigger signal device for transmitting a trigger signal.

6. The system defined in claim 1 wherein at least one of the transmitters includes a trigger signal recorder.

7. The system defined in claim 1 wherein at least one of the transmitters includes an absorption device for absorbing an energy fraction coupled to a user and defined in inductive or capacitive interactive effects, at least a part of the energy fraction absorbed in the transmitters being utilized for the generation of the respective object signal.

* * * * *